United States Patent
Grolier et al.

(10) Patent No.: US 8,109,309 B2
(45) Date of Patent: Feb. 7, 2012

(54) TIRE WITH SEATS OF UNEQUAL DIAMETERS AND REVERSE AXIAL OFFSET IN AN INFLATED STATE

(75) Inventors: Nicolas Grolier, Clermont-Ferrand (FR); Nicolas Janin, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 826 days.

(21) Appl. No.: 12/162,380

(22) PCT Filed: Jan. 30, 2007

(86) PCT No.: PCT/EP2007/050917
§ 371 (c)(1),
(2), (4) Date: Jul. 28, 2008

(87) PCT Pub. No.: WO2007/088169
PCT Pub. Date: Aug. 9, 2007

(65) Prior Publication Data
US 2009/0014108 A1    Jan. 15, 2009

(30) Foreign Application Priority Data
Feb. 1, 2006 (FR) ..................... 06 09026

(51) Int. Cl.
*B60C 3/06* (2006.01)
*B60C 15/00* (2006.01)

(52) U.S. Cl. ............... 152/456; 152/539

(58) Field of Classification Search ........ 152/454–456, 152/539–547
See application file for complete search history.

(56) References Cited

U.S. PATENT DOCUMENTS

| | | | | |
|---|---|---|---|---|
| 2,108,329 A | | 5/1937 | Carter | 152/20 |
| 3,656,532 A | * | 4/1972 | Roberts | 152/455 |
| 4,124,679 A | * | 11/1978 | DeWitt | 264/233 |
| 4,271,889 A | * | 6/1981 | Pommier | 152/454 |
| 5,301,728 A | | 4/1994 | Brown, Jr. et al. | 152/209 |
| 6,688,354 B2 | * | 2/2004 | Drieux et al. | 152/158 |
| 6,883,568 B2 | * | 4/2005 | Muhlhoff | 152/197 |

* cited by examiner

*Primary Examiner* — Katarzyna Wyrozebski Lee
*Assistant Examiner* — Scott W Dodds
(74) *Attorney, Agent, or Firm* — Fitzpatrick, Cella, Harper & Scinto

(57) ABSTRACT

A tire is provided that includes a crown with a mid-plane S, two sidewalls, a first bead, of diameter $\Phi_1$, intended to be positioned on the outboard side of a vehicle, and a second bead, of diameter $\Phi_2$, intended to be positioned on the inboard side of a vehicle, such that $\Phi_1 > \Phi_2$. When the tire is mounted on its working rim and inflated to its nominal pressure, the mid-plane S of the crown is axially offset towards the first bead relative to a mid-plane B of the beads by a positive or zero distance D.

1 Claim, 3 Drawing Sheets

TIRE WITH SEATS OF UNEQUAL DIAMETERS AND REVERSE AXIAL OFFSET IN AN INFLATED STATE

The subject of the invention is a tire the two beads of which have different diameters and in which the larger-diameter bead is intended to be positioned on the outboard side of a vehicle.

It can be observed that when a tire such as this is mounted on its working rim and inflated substantially to its nominal pressure, there is an axial offset of the entire crown of the tire towards the smaller-diameter bead. This offset is associated with the fact that the resultant, in the axial direction, of the forces due to the internal inflation pressure is non-zero because the two sidewalls of the tire are of unequal lengths.

This axial offset towards the inboard side of the tire may have the result that, in the inflated and unflattened state, it is the outboard bead or the outboard seat which is axially furthest towards the outboard side of the tire and wheel assembly rather than the outboard sidewall of the tire. This may make the wheel or the bead of the tire more sensitive to various knocks and accidents in use.

This axial offset also has the effect of altering the visual appearance of the tire-wheel assembly in a way that may have various consequences in terms of the design and style of a vehicle.

The subject of the invention is a tire that includes a crown with a mid-plane S, two sidewalls, a first bead, of diameter $\Phi_1$, intended to be positioned on the outboard side of a vehicle, and a second bead, of diameter $\Phi_2$, intended to be positioned on the inboard side of a vehicle and such that $\Phi_1 > \Phi_2$, characterized in that, when the tire is mounted on its working rim, inflated substantially to its nominal pressure and not flattened, the mid-plane S of the crown is axially offset towards the first bead relative to the mid-plane B of the beads by a positive or zero distance D.

This tire is such that the influence of the axial offset due to the inflation forces exerted on two sidewalls of unequal lengths is cancelled out. As a result, the negative effects on durability and in-service damage, for example when mounting or dropping down from a curb or when curbing the wheels, are also cancelled out by comparison with standard tires with the same bead diameters.

Another subject of the invention is a method of manufacturing a tire that includes a crown with a mid-plane S, two sidewalls, a first bead, of diameter $\Phi_1$, intended to be positioned on the outboard side of a vehicle, and a second bead, of diameter $\Phi_2$, intended to be positioned on the inboard side of a vehicle and such that $\Phi_1 > \Phi_2$, characterized in that use is made of a mould in which, if the mid-plane of the beads B is defined as the plane parallel to the plane S and positioned axially at an equal distance from the first and second beads, then the mid-plane of the beads B is axially offset towards the second bead relative to the mid-plane S of the crown by a given distance L.

As a preference, the distance L is such that, when the tire is mounted on its working rim, inflated to its nominal pressure and not flattened, the mid-plane of the beads B is axially offset towards the second bead relative to the mid-plane S of the crown by a positive or zero distance D.

Axially offsetting the mid-plane of the beads in the direction of the smaller-diameter inboard bead when curing the tire effectively makes it possible to compensate for and even reverse the consequences of the non-zero axial resultant of the inflation pressure.

As a preference, the distance L is such that $$L > \frac{\Phi_1 - \Phi_2}{5}$$

and even $$L > \frac{\Phi_1 - \Phi_2}{4}.$$

As a result, for a bead diameter difference of the order of 20 mm, the length of the misalignment between the two mid-planes L is greater than 4 mm and preferably greater than 5 mm.

According to a first way of implementing the invention, adopting by way of reference the tire mounted on its working rim, the curing mould is such that the second bead is substantially at the same axial distance from the mid-plane of the crown S and the first bead is at an axial distance reduced by 2L from the mid-plane of the crown S.

This modification to the curing mould is particularly easy to perform.

According to a second way of implementing the invention, adopting by way of reference the tire mounted on its working rim, the curing mould is such that the first and second beads are both axially offset towards the smaller-diameter bead by a distance L relative to the mid-plane of the crown S.

This modification to the curing mould entails a re-design of the parts that mould the two beads and the two sidewalls and therefore proves more expensive.

Other features and advantages of the invention will emerge from the description given hereinafter with reference to the attached drawings which, by way of nonlimiting examples, show some embodiments of the subject matter of the invention.

Any plane passing through the axis A of rotation of the wheel and of the rim is known as a meridian or axial plane.

Figure 1:
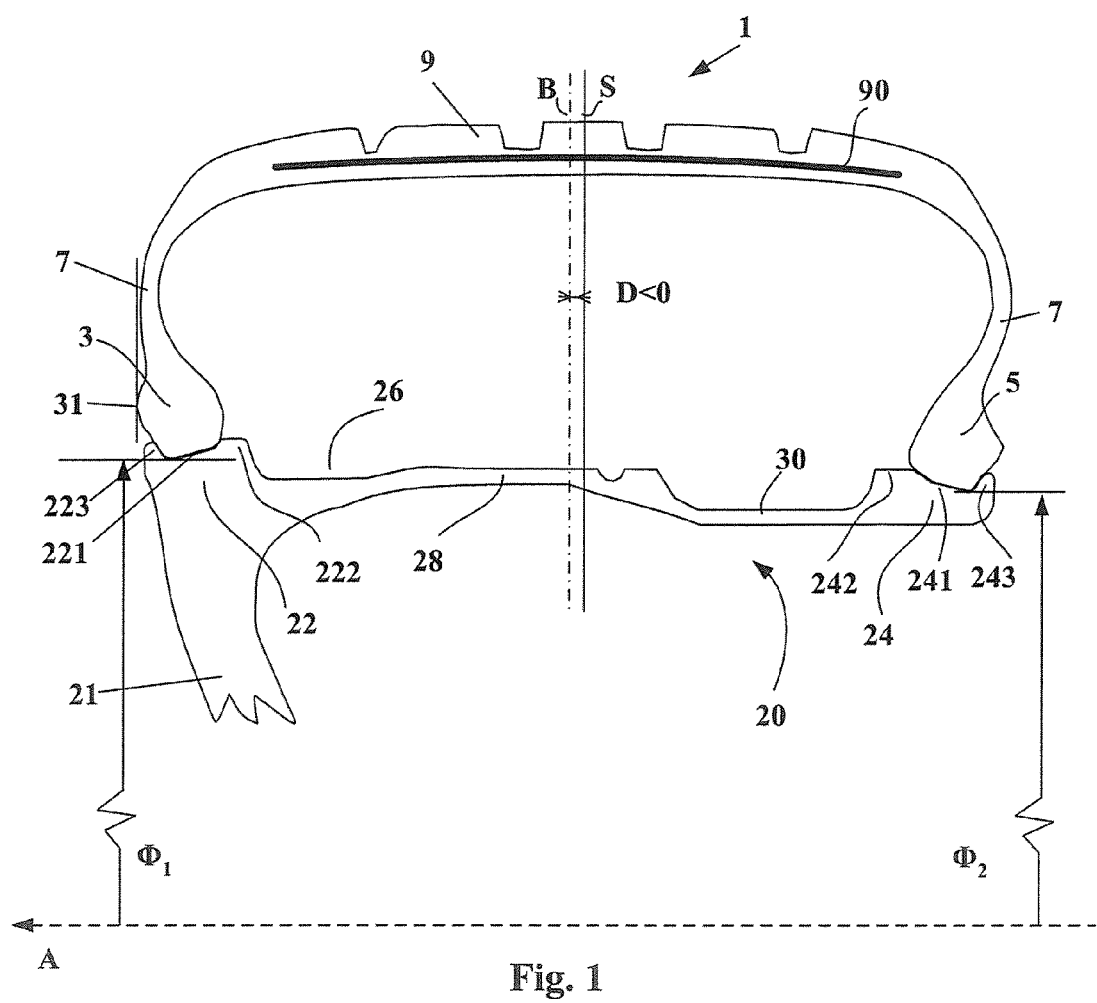
FIG. 1 shows a partial view in meridian cross section of a conventional tire mounted on its working rim and inflated substantially to its nominal pressure.

FIG. 1 shows, viewed in meridian or axial part section, a tire 1 mounted on its working rim 20, inflated substantially to its nominal service pressure and unflattened. The rim 20 forms, with a wheel disc 21, a one-piece wheel. The disc may also be manufactured independently of the rim and connected to the latter thereafter. The rim 20 includes a first seat 22 and a second seat 24, which seats are intended to serve as bearing surfaces for the first 3 and second 5 beads of the tire 1.

The first seat 22 has a tapered bottom 221 that locally coincides with a cone of revolution coaxial with the rim and open towards the second seat 24, a safety hump 222 extending the bottom 221 of the first seat 22 towards the second seat 24, and an external flange 223 extending the bottom 221 of the first seat on the opposite side to the second seat 24.

The second seat 24 has a tapered bottom 241 that locally coincides with a cone of revolution coaxial with the rim and open towards the first seat 22, a safety hump 242 extending the bottom 241 of the second seat 24 towards the first seat 22 and an external flange 243 extending the bottom 241 of the second seat on the opposite side to the first seat 22.

The maximum diameter of the second seat is smaller than that of the first seat. In the example depicted, the order of magnitude of the difference between the maximum diameters is of the order of 20 mm. The difference between the minimum radii of the two seats is therefore of the order of 10 mm.

Working from the first seat 22 towards the second seat 24 there are, in succession, a circumferential well 26, a bearing surface 28 and a second circumferential well 30. The first circumferential well 26 acts as a mounting well for the first seat 22. The outside diameter of the bearing surface 28 corresponds substantially to the maximum diameter of the second seat 24 so that a support (not depicted) can be slipped over this bearing surface 28 past the second seat 24.

The rim 20 depicted is a preferred rim but any other rim with unequal seat diameters can be applied to tires according to the invention.

The tire 1 includes two beads 3 and 5 bearing against the seats 22 and 24 of the rim 20, two sidewalls 7 and a crown 9. Each bead has annular reinforcements directed substantially circumferentially and which are practically inextensible. These reinforcements, such as bead wires, are intended in use to hold the beads on the rim seats. The first bead 3 has a (minimum) diameter $\Phi_1$ greater than the diameter $\Phi_2$ of the second bead 5. The bead 3 bears against the seat 22 of the rim 20 positioned on the side where the rim meets the disc 21. This is the side intended to be positioned on the outboard side of a vehicle.

FIG. 1 defines the mid-plane S, which is the mid-plane of the crown, and the mid-plane B, which is the mid-plane of the beads mounted on their working rim (or the mid-plane of the seats of the rim 20). The mid-plane S is defined as the plane perpendicular to the axis A and equidistant from the ends of the reinforcing plies 90 of the crown 9. It can be seen that the mid-plane S of the crown 9 is axially offset towards the second bead 5 by a distance D relative to the mid-plane B of the beads, the distance D here being negative if the direction towards the outboard side of the rim 20 is adopted as being the positive direction for the axis A.

This axial offset towards that side of the rim that is intended to be positioned toward the inboard side of the vehicle (or inboard side of the rim) is due to the fact that the two sidewalls 7 are of unequal lengths because of the difference in diameter between the two beads 3 and 5. The resultant of the forces associated with the inflation pressure in the axial direction is therefore not substantially zero as is customarily the case for tires in which the two beads have the same diameter, but is directed towards the side of the taller sidewall, in this instance, the inboard side of the rim.

It can be seen in FIG. 1 that, as a result, the part of the tire 1 and rim 20 assembly that is axially furthest towards the outboard side is the end of the bead 3, referenced 31. What this means is that when a curb is knocked or the wheels are curbed, for example, this part of the bead is highly exposed to damage.

Figure 2:
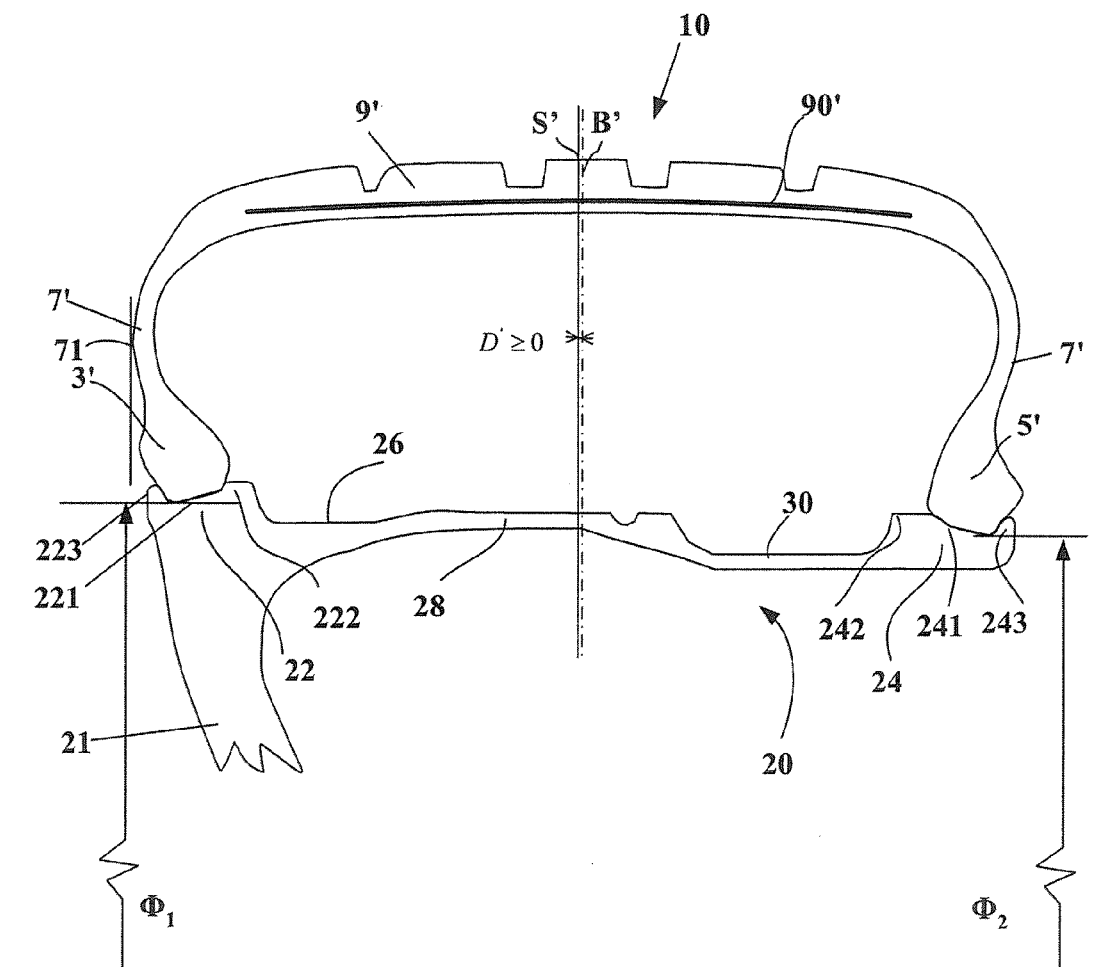
FIG. 2 shows, in a view similar to FIG. 1, a second tire according to the invention.

FIG. 2 shows a tire 10 according to the invention, mounted on its working rim 20, inflated to substantially its nominal pressure and unflattened. This tire includes two beads 3' and 5' bearing on the seats 22 and 24 of the rim 20, two sidewalls 7' and a crown 9'. The mid-plane of the beads is referenced B' and the mid-plane of the crown is referenced S'. It can be seen that, for this tire, the plane S' is axially offset towards the first bead 3' by a positive distance D'.

As a result, the point positioned axially furthest towards the outboard side of the tire 10 and rim 20 assembly is no longer the end of the bead 30' but part of the sidewall referenced 71. This improves the ability of the tire 10 to withstand knocks and accidents that it is liable to encounter in use by reducing exposure of the bead 3'. This also has the advantage of changing for the better the visual appearance of the tire mounted on its working rim 20.

Figure 3:
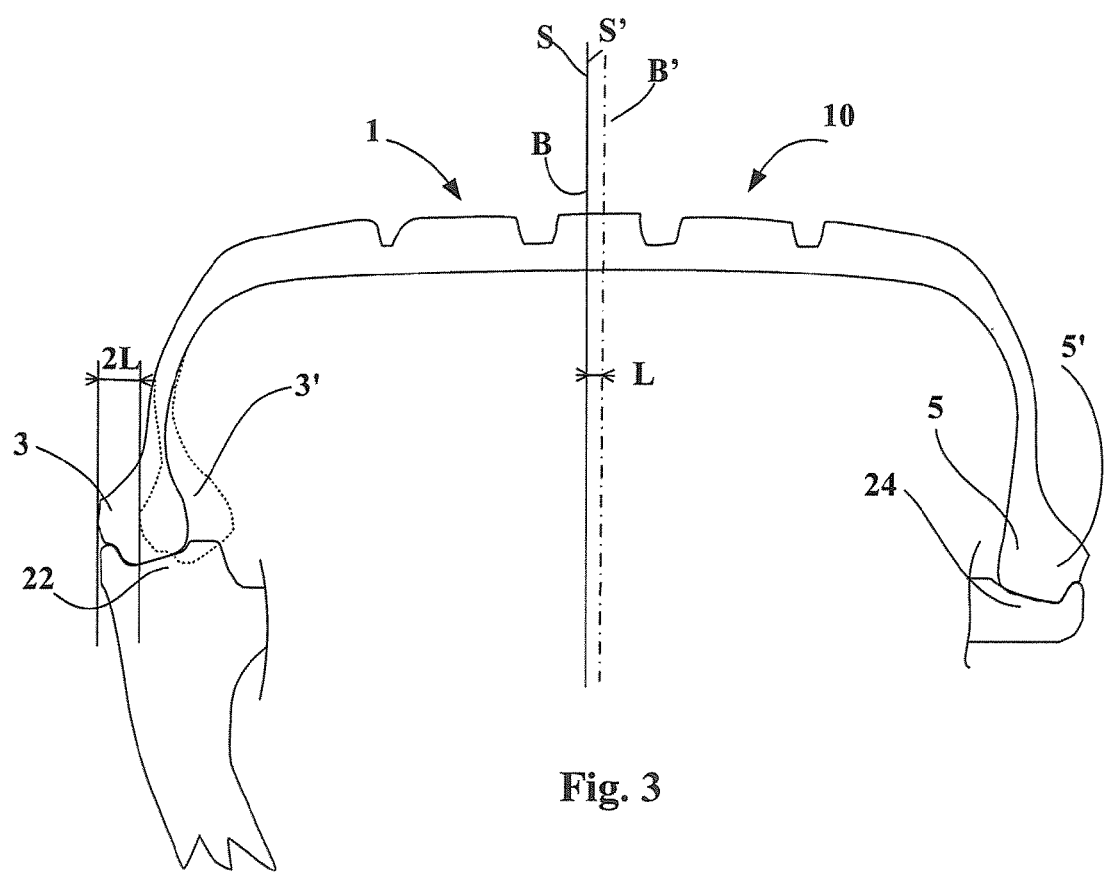
FIG. 3 shows a partial view in meridian cross section of the molding profile of a tire illustrating the invention.

FIG. 3 illustrates a preferred embodiment of the tire according to the invention. FIG. 3 shows the profile of the tires 1 and 10 as they are being molded in their curing mould (not depicted).

The tire 1 has a molding profile such that the mid-planes of the beads and of the crown substantially coincide while the tire is being cured. The two beads 3 and 5 are depicted bearing on the rim seats 22 and 24 but the distance between the two seats may be identical to the distance between the seats on the working rim 20 or greater or smaller. What is important is that the two mid-planes B and S of the tire 1 substantially coincide.

The tire 10 has a molding profile similar to that of the tire 1 except for the position of the bead 31 which is axially offset towards the inboard side by a distance 2L. This distance 2L, when the difference in bead diameter is of the order of 20 mm, is greater than 8 mm and preferably greater than 10 mm. In order to illustrate these differences clearly, FIG. 3 (like the other figures) is not to scale.

As a result, it can be seen that the mid-plane of the crown S' of the tire 10 does indeed, during curing, remain coincident with the mid-plane of the crown S of the tire 1. By contrast, the mid-plane of the beads B' is axially offset towards the smaller-diameter bead 5 by a distance L.

This embodiment is easy to implement and reduces the costs involved because the shells that keep the bead shifted are practically the only things that have to be modified without any need to alter the rest of the mould.

Tests have been carried out on a 235-660 R480 U tire with a difference in bead diameters of 20 mm. At the time of curing, offsetting the outboard bead by 20 mm (L=5 mm) allowed the axial offset of the crown in the inflated state, which for curing performed with the mid-planes S and B coincident was of the order of 4 mm, to be brought back to zero.

The invention is not limited to the examples described and depicted and various modifications can be made thereto without departing from its scope as defined by the attached claims.

The invention claimed is:

1. A tire, comprising:
   a crown with a mid-plane S;
   two sidewalls extending from opposite sides of the crown;
   a first bead, of diameter $\Phi_1$, intended to be positioned on an outboard side of a vehicle, the first bead being located at an end portion of a first one of the two sidewalls; and
   a second bead, of diameter $\Phi_2$, intended to be positioned on an inboard side of the vehicle, the second bead being located at an end portion of a second one of the two sidewalls,
   wherein $\Phi_1 > \Phi_2$,
   wherein the mid-plane S is equidistant from first and second ends of reinforcing plies of the crown, and
   wherein, when the tire is mounted on its working rim and inflated to its nominal pressure, the mid-plane S of the crown is axially offset towards the first bead relative to a mid-plane B of the first and second beads by a positive distance D.

* * * * *

UNITED STATES PATENT AND TRADEMARK OFFICE
CERTIFICATE OF CORRECTION

PATENT NO. : 8,109,309 B2  
APPLICATION NO. : 12/162380  
DATED : February 7, 2012  
INVENTOR(S) : Nicolas Grolier et al.

Page 1 of 1

It is certified that error appears in the above-identified patent and that said Letters Patent is hereby corrected as shown below:

[57] ABSTRACT

Line 5, "$\Phi_1 > \Phi_2$" should read --$\Phi_1 > \Phi_2$--.

COLUMN 1

Line 33, "$\Phi_1 > \Phi_2$" should read --$\Phi_1 > \Phi_2$--.
Line 51, "$\Phi_1 > \Phi_2$" should read --$\Phi_1 > \Phi_2$--.

COLUMN 4

Line 20, "bead 31" should read --bead 3'--.

Signed and Sealed this  
Seventeenth Day of April, 2012

David J. Kappos  
*Director of the United States Patent and Trademark Office*